United States Patent
Wernli et al.

(10) Patent No.: US 12,441,895 B2
(45) Date of Patent: Oct. 14, 2025

(54) METHOD AND SYSTEM FOR TREATING EQUIPMENT SURFACE

(71) Applicant: KopMan LLC, Refugio, TX (US)

(72) Inventors: Clayton Dale Wernli, Refugio, TX (US); Joshua Lee Kea, San Antonio, TX (US)

(73) Assignee: KopMan LLC, Refugio, TX (US)

( * ) Notice: Subject to any disclaimer, the term of this patent is extended or adjusted under 35 U.S.C. 154(b) by 11 days.

(21) Appl. No.: 18/461,002

(22) Filed: Sep. 5, 2023

(65) Prior Publication Data

US 2024/0076506 A1 Mar. 7, 2024

Related U.S. Application Data

(60) Provisional application No. 63/403,562, filed on Sep. 2, 2022.

(51) Int. Cl.
| | |
|---|---|
| *B08B 3/04* | (2006.01) |
| *C09D 5/16* | (2006.01) |
| *C09D 7/61* | (2018.01) |
| *C09D 127/12* | (2006.01) |

(52) U.S. Cl.
CPC .............. *C09D 5/1668* (2013.01); *B08B 3/04* (2013.01); *C09D 7/61* (2018.01); *C09D 127/12* (2013.01)

(58) Field of Classification Search
None
See application file for complete search history.

(56) References Cited

U.S. PATENT DOCUMENTS

| | | | |
|---|---|---|---|
| 6,156,661 A | 12/2000 | Small | |
| 2002/0170573 A1* | 11/2002 | Christenson | ...... H01L 21/67051 134/33 |
| 2003/0148207 A1* | 8/2003 | Maemoto | ............... B41N 3/034 430/273.1 |

(Continued)

FOREIGN PATENT DOCUMENTS

WO 2021030523 A1 2/2021

OTHER PUBLICATIONS

Search Report and Written Opinion on Patentability issued on Jan. 24, 2024 in corresponding International Application No. PCT/US23/73460, 7 pages.

*Primary Examiner* — Michael P. Rodriguez
(74) *Attorney, Agent, or Firm* — Maier & Maier, PLLC

(57) ABSTRACT

A system and method for cleaning, preparing, and treating a new or used equipment surface with surface property modifiers. The method may include a cleaning procedure using clean water, a preparation of substrate to verify all areas of the substrate are clean and dry, a chemical preparation of the surface of the substrate by using a $1^{st}$ alkaline preparation chemical and $2^{nd}$ neutralizer preparation chemical to raise the surface area tension as high as possible and remove any hydrocarbon molecules and any possible organic oils that were left over from forming, rinsing and drying the substrate by using Isopropyl Alcohol to speed up the process, and applying at least an oxidizer to modify the surface property, such that a strong covalent bond can be formed, thereby preventing impurities from adhering to the treated surface.

11 Claims, 2 Drawing Sheets

(56) References Cited

U.S. PATENT DOCUMENTS

2004/0055490 A1   3/2004   Sampei
2008/0216710 A1   9/2008   Beam et al.
2019/0187557 A1   6/2019   Ochimizu et al.

\* cited by examiner

METHOD AND SYSTEM FOR TREATING EQUIPMENT SURFACE

BACKGROUND

The present invention relates generally to a method and system for treating the equipment surface to prevent impurities from adhering to the surface, and more specifically, a method and system for cleaning, preparing, and treating a new or used equipment surface with surface property modifiers (SPMs).

Over time, constant flow of fluid creates fouling on equipment services causing inaccurate readings, decreased flow and operation as well as increased maintenance costs. Preventing fouling of measurement devices is crucial to ensuring accuracy, integrity, and reducing uncertainty in measurement.

Accordingly, there is an increasing need to develop a proprietary procedure and system, in combination with surface modified products, that reduces the surface tension of a substrate by forming a strong covalent bond to repel all fouling, thereby increasing the reliability in the accuracy of the instrument's measurement and decreasing maintenance and costs associated.

SUMMARY

A system and method for cleaning, preparing, and treating a new or used equipment surface with surface property modifiers to form a strong covalent bond on the substrate surface that reduces the surface tension of the substrate and repels fouling may be provided.

The method for cleaning, preparing, and treating a new or used substrate may include: cleaning a substrate using clean water; chemically changing the support surface structure to accept the treatment product; verifying that the substrate is at its highest tension strength of expectations; and treating the surface of the substrate with surface property modifiers which may include, for example but not limited to, an anti fouling treatment chemical, degreasers, and acid modifiers sequentially.

The system for cleaning, preparing, and treating a new or used substrate may comprise: a clean water supply device comprising 15,000 psi flex hose with NPT (National Pipe Threads) threads and couplings, and 10 k tri-plex plunger; a substrate surface preparation device which is configured to chemically change the support surface structure to accept the treatment product; Dyne test ink kit for verifying that the substrate is at its highest tension strength of expectations; and a surface modification device configured for treating the surface of the substrate with surface property modifiers (SPMs) comprising, for example, different water soluble solvents, degreasers, and acid modifiers to modify the surface property of the substrate.

The present surface treatment method and system may form a strong covalent bond on the surface of the substrate that may prevent impurities from adhering to the treated surface of the equipment, repel damaging build-up on the surface, keep the equipment clean, and/or increase lifetime and functionality of the equipment.

BRIEF DESCRIPTION OF THE FIGURES

Advantages of embodiments of the present invention will be apparent from the following detailed description of the exemplary embodiments. The following detailed description should be considered in conjunction with the accompanying figures in which.

DETAILED DESCRIPTION OF THE EMBODIMENTS

Aspects of the invention are disclosed in the following description. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention comprise the discussed feature, advantage or mode of operation.

Exemplary embodiments described herein may relate to a method for treating a substrate.

Figure 1:
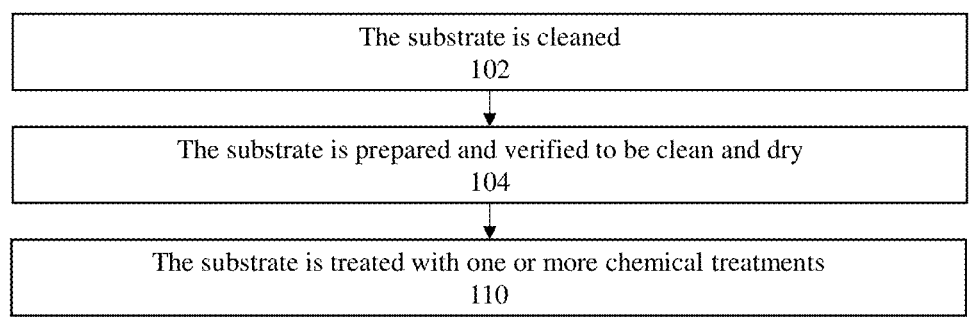
FIG. 1 is an exemplary method for cleaning, preparing, and treating a substrate.

Referring to FIG. 1 a method for cleaning, preparing, and treating a substrate 100 may shown and described. In a first step 102 the substrate may be cleaned using, for example, cleaning water. In a next step 104 the substrate may be prepared and all areas of the substrate may be verified to be clean and dry. In a final step 106 the substrate may be treated with, for example, a $1^{st}$ high alkaline preparation chemical to emulsify any oils or fouling and a $2^{nd}$ neutralizer preparation chemical, such as an oxidizer or acid product, which may raise the surface area tension (for example, from 34 cm/sq to 38 cm/sq or 40 cm/sq). It may be understood that the treatment may also remove any hydrocarbon molecules and any possible organic oils that were left over from the metal forming. After treatment a rinsing/drying agent may be applied to the substrate, which may be, for example, isopropyl alcohol or an isopropyl alcohol mixture. rinsing and drying substrate by using a rinsing/drying agent such as Isopropyl Alcohol may speed up the process of subsequent steps to modify the substrate surface properties.

In an exemplary embodiment, the cleaning procedure may comprise the following additional steps to secure the closed loop cleaning system: verifying the substrate in question is isolated and free from energy sources; verifying any internals as shown in the vessel drawings that could pose a potential threat to the nozzle; and/or performing JSA (Job Hazard Analysis).

In some embodiments, the cleaning procedure may start from substrate preparation. The substrate preparation may require I&E (Instrumentation and Electrical) support to remove any automation devices inside attached to the line. If the line is deficient in structure, for example patches, cover ups, etc, on the external side of the line, operations may be notified and all parties may need to buy in prior to moving forward, and verify all conditions of internals via drawings and Operations support.

In an exemplary embodiment, the cleaning procedure may further comprise installing the cleaning—preparation. Installing the cleaning-preparation may include initiating PPE (Personal Protective Equipment) Requirements, indicating pump operator, indicating nozzle operator, and/or establishing communications between both operators.

In an exemplary embodiment, the cleaning procedure may further comprise establishing line reference points. The establishing line reference points may include verifying reference points, bends, 90's, 45's, etc, and expecting limited penetration through these points, following extraction procedure around these points, and/or verifying drain points and containments are set for returns monitoring.

In an exemplary embodiment, the cleaning procedure may further comprise starting pump and setting pressure. Starting pump and setting pressure may include verifying leak checks, grounding pumps, verifying any drains are clear, starting pumps, beginning to prime lines by slowly moving pressure up to the desired rate, wherein rate is determined by overall volume of the nozzle, setting final pressure rating on monitor (gauge at discharge of flowback) and/or monitoring pump performance.

In an exemplary embodiment, the cleaning procedure may further include performing dynamic cleaning. Performing dynamic cleaning may include verifying final pressure settings and monitor pumps, verifying fluids are in return troughs, drains, or day tanks. If the returns quit, services may be stopped and the procedure may return to the open drain steps, solids may be verified to be as expected for the operations. Additionally, all returns may be monitored for cleaning effectiveness and all hose connections may be monitored for any leaks. It may be understood operations may be shut down if leaks are noticed, and starting time and pressure of the leak may be noted, and continue cleaning until returns are favorable. When the returns are approved after cleaning shut-down may begin.

In an exemplary embodiment, the cleaning procedure may further include a shut down procedure. The shut down procedure may include after the cleaning is deemed acceptable, moving the pump volume to low, disengaging any generators from hydraulics, removing hoses from the line, closing supply valves by draining the vessel to the day tanks and using, for example, a vacuum truck to begin disposal of returns, closing drain valve, installing containments to hose/vessel connection which may include preparing for minimal leakage from hose prime and using, for example, the vacuum truck to remove prime fluid, verifying breathing air needed to remove tools from the tank, returning all fittings and vessel back to as found conditions, rolling up all hoses and verifying gasket condition by securing hoses to trailer, and/or vacuuming all returns from day tanks to disposal truck by cleaning and rinsing as needed to return to service condition.

In addition, in some embodiments, the cleaning procedure may include an overall site preparation step. The overall site preparation may include securing all hoses and nozzles to a trailer, verifying all fluids are drained from the trailer and removing any support jacks, beginning site cleaning up, performing inventory control, executing safety review, verifying all flange connections are secure—as found, disposing of all non-hazardous trash, and/or using vacuum service to dispose of all foreign debris combined with the returns.

In may be understood that in some embodiments in order to prepare the substrate for treatment it is important to verify that all areas of the substrate are clean and dry.

In an exemplary embodiment, nitrogen ($N_2$) gas may be used to first dry the surface of the substrate. Then, the surface tension may be determined using, for example, Dyne Test Inks, or by measuring contact angle with a water testing device. In an embodiment the surface tension may preferably be greater than 42 Dyne. If the surface tension is less than 42 Dyne, then the cleaning process may be repeated.

Figure 2:
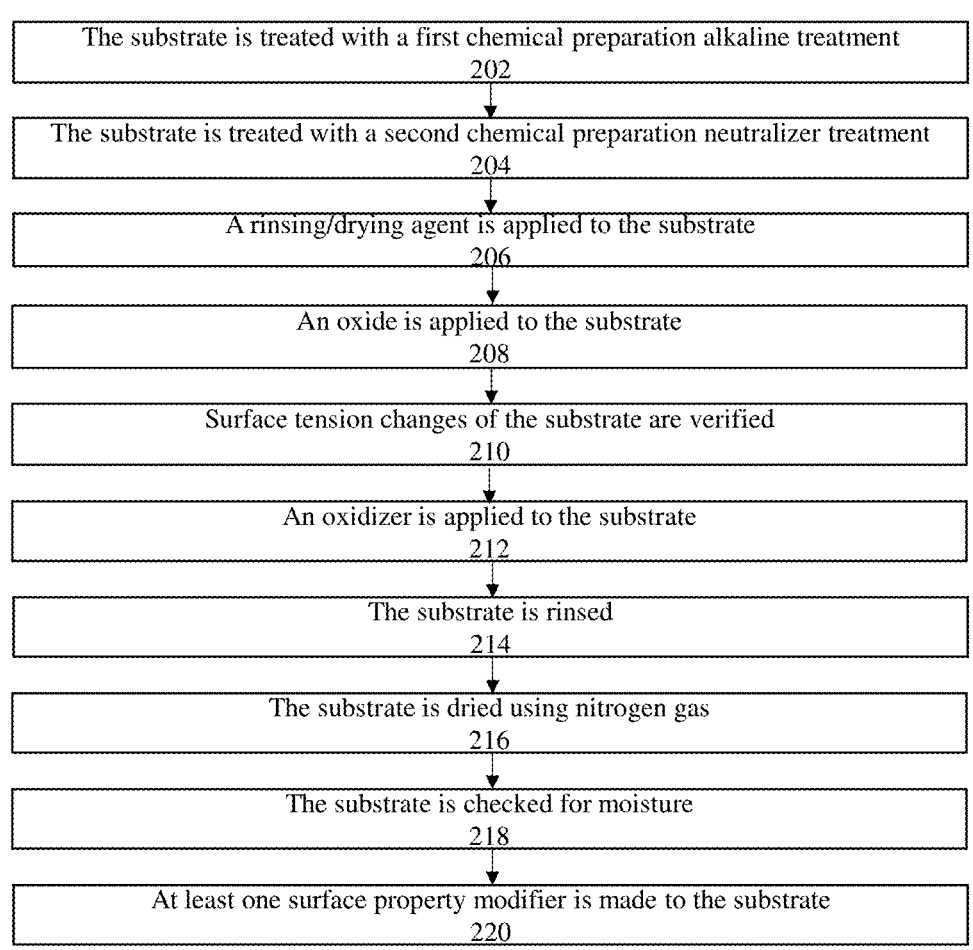
FIG. 2 is an exemplary method for chemically preparing a surface.

Referring to FIG. 2 a method for chemically preparing a surface 200 may be shown and described.

In general, it may be understood that the chemical preparation process may be used to raise the surface area tension of the treated surface as high as possible. For example 34 cm/sq to 38 cm/sq or 40 cm/sq. It may be understood that a high surface tension may be an indication that the surface is clean and ready for oxides to be built on the surface.

In a first step 202 the substrate surface may be treated with an alkaline treatment which may remove any hydrocarbon molecules that were left over from the metal forming, to protect during shipping, and/or foundry. Step 202 may further emulsify all hydrocarbon molecules on the substrate surface. In some embodiments the alkaline treatment may use Chemical Kop Man 2101. The alkaline treatment may be carried out by, for example, inserting a wick saturated in a high alkaline product and making three surface contacts.

In a next step 204 the substrate may undergo a second chemical preparation step using a neutralizer treatment. It may be understood that step 204 may act as a final detailed emulsification of the same metal forming hydrocarbons that may be left behind after step 202, including any possible organic oils. In some embodiments the second chemical preparation step 204 may use, for example, an alkaline degreaser with an added emulsifier. Step 204 may be carried out, for example, by inserting a wick saturated in the alkaline degreaser and making three surface contacts, that is three contact location on the wick, a front, middle, and back, may be used to ensure uniform application. In some circumstances fewer or more contact locations may be utilized, for example based on the size of the substrate the chemical is being applied to. In some embodiments the wick may be built of primarily moisture wicking material, such as quick-dry rags, which may allow for the wick to maintain moisture throughout the application process. In other embodiments the application may instead be performed via saturation or spraying. In a next step 206 a rinsing/drying agent (IPA) may be applied to the substrate. In a next step 208 an oxide such as a hydrophobic oxide reinforced polymer coating or any other oxide known in the art may be applied to the substrate. In some embodiments isopropyl alcohol or methanol may be further applied in step 208 in order to speed up the oxidation process.

In a next step 210 a change in the surface tension of the substrate may be verified. In an exemplary embodiment, Dyne test ink may be used to verify an increased strength. Dyne ink may applied to the surface and the Dyne level may be recorded. Once a change in the surface tension has been verified, the substrate may then be rinsed and dried.

In an exemplary embodiment, the substrate may be rinsed and dried with isopropyl alcohol, or, in some specific embodiments an about 90% isopropyl alcohol mixture. From three surface contacts, the Dyne strength may be determined and recorded.

In a next step 212 an oxidizer may be applied to the substrate. In an exemplary embodiment, the applied oxidizer may include hydrophobic oxide reinforced polymer coating or another oxide. From three surface contacts, the Dyne strength may be determined and recorded.

After applying the oxidizer, in a next step 214 the substrate may be rinsed. In an exemplary embodiment, rinsing may include applying, for example, a substance of about 70% or 90% isopropyl alcohol, for rinsing. In a next step 216 the substrate may be dried by applying nitrogen gas ($N_2$) to the substrate. From three surface contacts, the Dyne strength may be determined and recorded. In an exemplary embodiment, a nitrogen blanket may be applied for at least 10 minutes, which may be understood to achieve the desired drying.

After drying with nitrogen gas, in a next step 218 the moisture on the substrate may be determined. In an exemplary embodiment a cotton cloth may be used to determine moisture on the full substrate subjected to the treatment. From three surface contacts, the moisture on the cloth may be determined and recorded. If any moisture is found on the cloth, then the process may return to step 216 for additional drying.

Once the substrate is determined to be sufficiently free of moisture, in final step 220 at least one application of a surface property modifier (SPM) to the substrate may be made.

In an exemplary embodiment, two separate applications of an SPM may be made. In a first SPM application, an Anti-Fouling Treatment (AFT) product, for example an opaque fluorinated alkane-based coating may be applied. In an embodiment the wick may be used. From three surface contacts, the Dyne level strength may be determined and recorded. The Dyne level strength may be expected to be less than 30 Dyne. Then, in a second SPM application, the AFT product or another SPM may again be applied for, for example, 5 minutes. The second coat of AFT product may be applied in the same manner as the first or in a different method, for example spray application. From three surface contacts, the Dyne level strength may be determined and recorded. The Dyne level strength may be expected to be less than 30 Dyne.

After completion of the SPM application, final quality assurance and quality control checks may be made. In an exemplary embodiment, all Dyne in strength results may be recorded from the multiple locations on the substrate. If there is any variance of strength, then at least one SPM application may be repeated until, for example, a dyne level of less than 30 is obtained. If no variance of substrate levels of surface strength is determined, the substrate may be covered, all levels of completion may be recorded, and a report of the findings may be submitted.

As a result, it may be appreciated that with the present surface treatments, a strong covalent bond on the equipment's surface that may prevent impurities from adhering to the treated surface, and thus a shield of fouling resistance without altering the integrity of the equipment's surface may be achieved.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for cleaning, preparing, and treating a substrate comprising:
    cleaning the substrate and preparing the substrate; and
    treating the substrate, wherein treating the substrate further comprises;
        treating the substrate with a chemical alkaline treatment by applying an alkaline chemical to a substrate surface that removes hydrocarbon molecules on the substrate surface;
        treating the substrate with a chemical neutralizer treatment by applying a neutralizer chemical to the substrate surface that acts to emulsify hydrocarbons left behind on the substrate surface after treating the substrate with the chemical alkaline treatment;
        applying an oxide to the substrate surface;
        measuring surface tension changes of the substrate after applying the oxide to the substrate surface;
        applying an oxidizer to the substrate surface;
        rinsing and drying the substrate surface; and
        applying at least one surface property modifier to the substrate.

2. The method of claim 1, wherein treating the substrate further comprises checking the substrate for moisture after rinsing and drying the substrate surface;
    wherein, the rinsing and drying the substrate surface is repeated until the moisture on the substrate surface is below a predetermined threshold.

3. The method of claim 2, wherein rinsing the substrate surface comprises applying a substance of about 70% isopropyl alcohol to the substrate surface and drying the substrate surface comprises at least applying nitrogen gas to the substrate.

4. The method of claim 3, wherein the nitrogen gas is applied to the substrate as a nitrogen blanket for at least 10 minutes.

5. The method of claim 2, wherein the at least one surface property modifier is at least one of applying an anti-fouling treatment product and an opaque fluorinated alkaline-based coating.

6. The method of claim 5, wherein the opaque fluorinated alkaline-based coating is applied the substrate surface and 5 minutes later another coating of the opaque fluorinated alkaline-based coating is applied to the substrate surface.

7. The method of claim 1, wherein the oxide is a hydrophobic oxide reinforced polymer coating.

8. The method of claim 6, wherein isopropyl alcohol and/or methanol are applied to the oxide.

9. The method of claim 1, wherein cleaning the substrate further comprises cleaning the substrate with water and testing the surface tension of the substrate.

10. The method of claim 9, wherein testing the surface tension of the substrate includes making a Dyne ink strength reading from 3 different locations on the surface of the substrate.

11. The method of claim 5 where the at least one surface property modifier is applied by inserting a wick into the surface property modifier and then using the wick to apply the modifier to the substrate surface.

* * * * *